(12) United States Patent
De Sousa Pereira

(10) Patent No.: US 12,368,357 B2
(45) Date of Patent: Jul. 22, 2025

(54) MAGNETIC INTERACTION SYSTEM BETWEEN ROTORS FOR PRODUCTION AND STORAGE OF KINETIC ENERGY

(71) Applicant: NEODYMOTORS GMBH, Munich (DE)

(72) Inventor: Paulo Eduardo De Sousa Pereira, Munich (DE)

(73) Assignee: NEODYMOTORS GMBH, Munich (DE)

(*) Notice: Subject to any disclaimer, the term of this patent is extended or adjusted under 35 U.S.C. 154(b) by 0 days.

(21) Appl. No.: 18/555,950

(22) PCT Filed: Feb. 2, 2022

(86) PCT No.: PCT/IB2022/050906
§ 371 (c)(1),
(2) Date: Oct. 18, 2023

(87) PCT Pub. No.: WO2023/148519
PCT Pub. Date: Aug. 10, 2023

(65) Prior Publication Data
US 2024/0204636 A1 Jun. 20, 2024

(51) Int. Cl.
*H02K 16/02* (2006.01)
*H02K 1/27* (2022.01)
(52) U.S. Cl.
CPC .............. *H02K 16/02* (2013.01); *H02K 1/27* (2013.01)

(58) Field of Classification Search
CPC .......... H02K 7/02; H02K 7/025; H02K 16/00; H02K 16/02; H02K 49/102; H02K 49/104; H02K 49/106; H02K 49/108; H02K 53/00
See application file for complete search history.

(56) References Cited

U.S. PATENT DOCUMENTS 5,739,615 A     4/1998  McClelland
6,311,495 B1*  11/2001  Shimizu ................... B60K 6/26
                                                         903/917
(Continued)

FOREIGN PATENT DOCUMENTS

DE    102019005796 A1    2/2021
RU         207680 U1    11/2021
(Continued)

OTHER PUBLICATIONS

Wei, Machine Translation of WO20045760, Jan. 2004 (Year: 2004).*
(Continued)

*Primary Examiner* — Eric Johnson
(74) *Attorney, Agent, or Firm* — LUCAS & MERCANTI, LLP

(57) ABSTRACT

A magnetic interaction system between rotors for the production and storage of kinetic energy having a primary rotor mechanically adapted to at least one platform by a rotation axis, the primary rotor having a first set of magnets; and at least three secondary rotors, mechanically adapted to the at least one platform by independent rotation axes equidistant from the rotation axis of the primary rotor; characterized in that each of the at least three secondary rotors has at least two overlapping platforms over the same rotation axis, and on which a second set of magnets are adapted.

10 Claims, 7 Drawing Sheets

(56) References Cited

U.S. PATENT DOCUMENTS

| | | | |
|---|---|---|---|
| 2010/0283350 A1* | 11/2010 | Surodin | H02K 7/025 |
| | | | 415/916 |
| 2011/0211982 A1* | 9/2011 | Marks | F04D 29/046 |
| | | | 417/420 |
| 2013/0241206 A1 | 9/2013 | Tkadlec | |
| 2015/0364981 A1 | 12/2015 | Reinosa et al. | |

FOREIGN PATENT DOCUMENTS

| WO | 2004005760 A1 | 1/2004 |
|---|---|---|
| WO | 2012044791 A1 | 4/2012 |
| WO | 2020183218 A1 | 9/2020 |

OTHER PUBLICATIONS

International Search Report and Written Opinion for Corresponding International Application No. PCT/IB2022/050906 14 pages, Oct. 5, 2022.

* cited by examiner

MAGNETIC INTERACTION SYSTEM BETWEEN ROTORS FOR PRODUCTION AND STORAGE OF KINETIC ENERGY

CROSS-REFERENCE TO RELATED APPLICATION

This application is a 371 of PCT/IB2022/050906, filed Feb. 2, 2022, which is incorporated herein by reference.

TECHNICAL DOMAIN

The present invention describes a magnetic interaction system between rotors for the production and storage of kinetic energy.

BACKGROUND

Presently, mechanisms are known from the state of the art which allow the storage of energy through flywheels to be carried out.

This type of mechanism promotes the conservation of angular momentum to store rotational energy, being a form of kinetic energy proportional to the product of its moment of inertia by the square of its angular speed, which mathematically gives:

$$\text{Rotational Kinetic Energy} = 0.5 \times I \times \omega^2$$

wherein: I=inertia and ω=angular speed.

Typical energy storage systems using flywheels comprise a circular base flywheel supported by a bearing through a rotation axis, which is mechanically coupled to a mechanical propulsion system (motor/generator). When the mechanical propulsion system comes into operation, the flywheel begins to rotate on the axis, starting the accumulation of energy in the form of kinetic energy in its rotation, later converting this rotational kinetic energy into electrical energy. However, and to promote this conversion, the systems presently conceived need to resort to the motor-generator mechanically adapted to the axis by means of the flywheel. The present invention aims to describe an innovation in said state of the art approach, providing an effective and highly efficient system through the magnetic interaction between rotors for the production and storage of rotational kinetic energy.

Through the present invention it is possible, in an efficient and optimized way, to produce and store rotational kinetic energy in a set of secondary rotors arranged around a primary rotor, without the need for motors or any external equipment coupled to the axis of the secondary rotors.

SUMMARY

The present invention describes a magnetic interaction system between rotors for the production and storage of kinetic energy, comprising a primary rotor mechanically adapted to at least one platform by means of a rotation axis, said primary rotor comprising a first set of magnets; and at least three secondary rotors, mechanically adapted to the at least one platform by means of independent rotation axes equidistant from the rotation axis of the primary rotor; characterized in that each of the at least three secondary rotors comprises at least two overlapping platforms over the same rotation axis, and on which a second set of magnets is adapted.

In a possible embodiment of the present invention, each of the at least three secondary rotors comprises an intermediate platform between the at least two overlapping platforms.

In another possible embodiment of the present invention, the at least two overlapping platforms and the intermediate platform comprise a ring shape.

In another possible embodiment of the present invention, the second set of magnets adapted to the at least two overlapping platforms comprises clearances.

In another possible embodiment of the present invention, the clearances between the second set of magnets are filled by the intermediate platform.

In another possible embodiment of the present invention, the primary rotor comprises a closed circular cover dimensionally adapted to incorporate the first set of magnets inside said cover, which presents noninterfering constructive properties with the magnetic fields of the first set of magnets and the second set of magnets and promotes the improvement of the aerodynamic performance of the primary rotor.

In another possible embodiment of the present invention, the first set of magnets is adapted to the primary rotor by means of a platform centrally positioned over the rotation axis.

In another possible embodiment of the present invention, the first set of magnets comprises a cross arrangement.

In another possible embodiment of the present invention, the first set of magnets comprises two primary magnets A and B magnetically joined and arranged on the narrower side face thereof on the surface of the platform centrally positioned over the rotation axis, a secondary magnet A and a secondary magnet B mounted laterally in the form of a cross and oppositely and coincident with the joining point of the two primary magnets A and B and the rotation axis.

In another possible embodiment of the present invention, the at least two overlapping platforms comprise a lower support platform and an upper support platform.

In another possible embodiment of the present invention, the second set of magnets comprises a lower set of magnets installed over the edge of the lower support platform, and an upper set of magnets installed over the edge of the upper support platform, wherein the upper set of magnets is separated from the lower set of magnets by the upper support platform.

In another possible embodiment of the present invention, the platform of the primary rotor centrally positioned over the rotation axis is positionally aligned with the elevation of the intermediate platform of the secondary rotor with reference to the at least one platform to which the primary and secondary rotors are mechanically adapted.

In another possible embodiment of the present invention, the primary rotor and the at least three secondary rotors comprise a cylindrical shape and magnetic rotation axis bearings mechanically adapted to the at least one platform in order to promote their suspension in vacuum closed environment.

In another possible embodiment of the present invention, the primary rotor and the at least three secondary rotors comprise a cylindrical shape within which the first set of magnets and the second set of magnets are installed.

In another possible embodiment of the present invention, the system comprises at least one overlapping and suspended set of primary rotors and at least one overlapping and suspended set of secondary rotors mechanically adapted to the at least one platform in order to optimize space and energy production capacity.

In another possible embodiment of the present invention, each of the at least three secondary rotors comprises a diameter greater than the diameter of the primary rotor, and wherein each of the at least three secondary rotors comprises an angular speed greater than the angular speed of the primary rotor.

BRIEF DESCRIPTION

The present invention concerns a magnetic interaction system between rotors for the production and storage of kinetic energy.

The system herein disclosed aims to optimize a production and storage process of kinetic energy by means of magnetic iteration between a primary central rotor and at least one secondary peripheral rotor disposed around the primary rotor. However, the system described below, demonstrates a greater degree of efficiency when implemented with a central primary rotor and three or four secondary rotors arranged around said primary central rotor. Both the primary rotor and the secondary rotors have a circular shape, and the secondary rotors, in addition to the circular shape, ideally have a ring shape, with the diameter and mass of the primary rotor being different from the diameter and mass of the secondary rotors, which is dimensionally adapted for the purpose of the present invention. Both the primary rotor and the secondary rotors resort to the use of at least one support platform that ensures their proper positioning over a rotation axis that is seated and mechanically connected to a technically adapted bearing system to minimize the resulting effects of friction between the rotating parts.

The motion of the secondary rotors, which in turn promote the production and storage of rotational kinetic energy, is induced/manifested through the magnetic interaction between them and the primary rotor, whose rotational motion of the primary rotor is guaranteed by the presence of a mechanical system that guarantees its correct operation. When the primary rotor goes into rotational motion, activated by said mechanical system, for example, an electric motor or powertrain mechanically adapted to the rotation axis thereof, it immediately induces/manifests rotational motion in the secondary rotors installed around it, through the interaction of magnetic fields between said rotors.

The perfect and correct magnetic interaction between the primary and secondary rotors, which allows the system to work perfectly and with the highest efficiency, is made through a set of magnets duly sized and positioned in each of said rotors.

In order to have a perfect magnetic interaction between the magnets of the primary rotor and the magnets of the secondary rotors, the triggering of the rotational motion in the primary rotor should be done slowly and progressively, transferring through the existing magnetic interaction between the rotors a continuous motion and a progressive speed to the secondary rotors.

As the rotational speed of the primary rotor is increased, for example, through the progressive increase in the voltage applied to the electrical motor mechanically adapted to the primary rotor axis, a rotational speed increase in secondary rotors is proportionally caused, through the correct magnetic interaction between the rotors. The increase in rotational speed in the primary rotor and induced in the secondary rotors is carried out continuously and gradually until the desired rotational speed in the set of rotors is achieved. The magnetic interaction between the rotors (primary and secondary) of the system is not made through magnetic coupling, but rather through magnetic induction/interaction. In practical terms, in the prototype models developed, to achieve the intended rotational speed in the set of rotors, it takes approximately 120 seconds from the static starting point, until reaching the intended rotational speed in both the primary and secondary rotors. Once the intended rotational speed is reached in the system, in the primary rotor and in the secondary rotors, through the perfect magnetic interaction between the rotating parts, the rotational speed of the set remains constant and uninterrupted, as long as the constant speed in the primary rotor is guaranteed. Thus, and thanks to this magnetic interaction between the rotors, it is possible, in an optimized way, to produce and store rotational kinetic energy in the set of secondary rotors, without the need for any type of motor or any external equipment coupled to the secondary rotor axis, thus converting the potential energy of the set of secondary rotors into rotational kinetic energy.

Note that there is no physical connection or mechanical transmission/interaction for the transfer of rotational motion between the primary rotor and any of the secondary rotors. The transfer of rotational motion between the primary rotor and the system's secondary rotors is guaranteed only by the perfect magnetic ratio/interaction between the rotors that are part of the presented system.

With the present magnetic interaction system between rotors for the production and storage of kinetic energy, it is possible to enhance the creation and storage of kinetic energy through the use of a single primary rotor, wherein said system promotes, through the induction/interaction of magnetic forces present in the rotors, rotational kinetic energy in the set of secondary rotors, which will convert their potential energy into rotational kinetic energy and efficiently store said energy. With the constructive architecture developed, it is also possible to minimize losses of mechanical origin since its use is reduced to the essential minimum in all existing moving parts.

BRIEF DESCRIPTION OF THE DRAWINGS

For an easier understanding of the present application, figures are herein attached, which represent embodiments which however are not intended to limit the art herein disclosed.

12—secondary magnet A of the primary rotor;
13—secondary magnet B of the primary rotor;
14—rotation axis of the primary rotor;
15—primary magnet B of the primary rotor;
16—support platform of the primary rotor;
20—secondary rotor.

Figure 1:
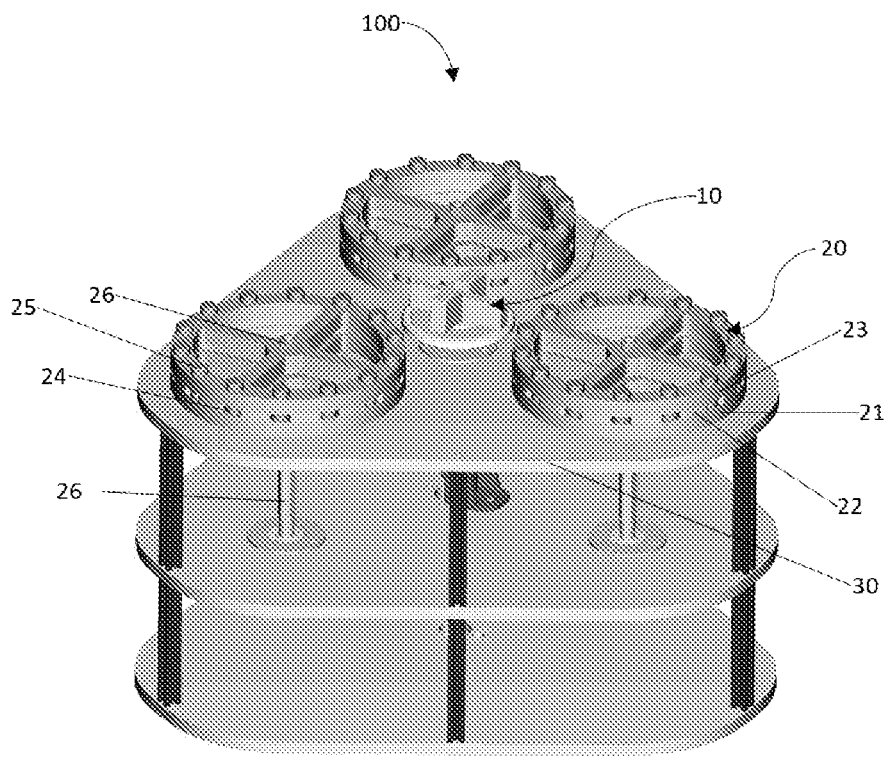
FIG. 1 illustrates a three-dimensional view of one embodiment of the magnetic interaction system between rotors for the production and storage of rotational kinetic energy, comprising a primary rotor and three secondary rotors, wherein the reference numbers refer to:
    100—magnetic interaction system between rotors for the production and storage of kinetic energy;
    10—primary rotor;
    20—secondary rotor;
    21—lower support platform of the secondary rotor;
    22—intermediate platform of the secondary rotor;
    23—upper support platform of the secondary rotor;
    24—lower magnet of the secondary rotor;
    25—upper magnet of the secondary rotor;
    26—rotation axis of the secondary rotor;
    30—horizontal support platform of the rotor structure.
Figure 2:
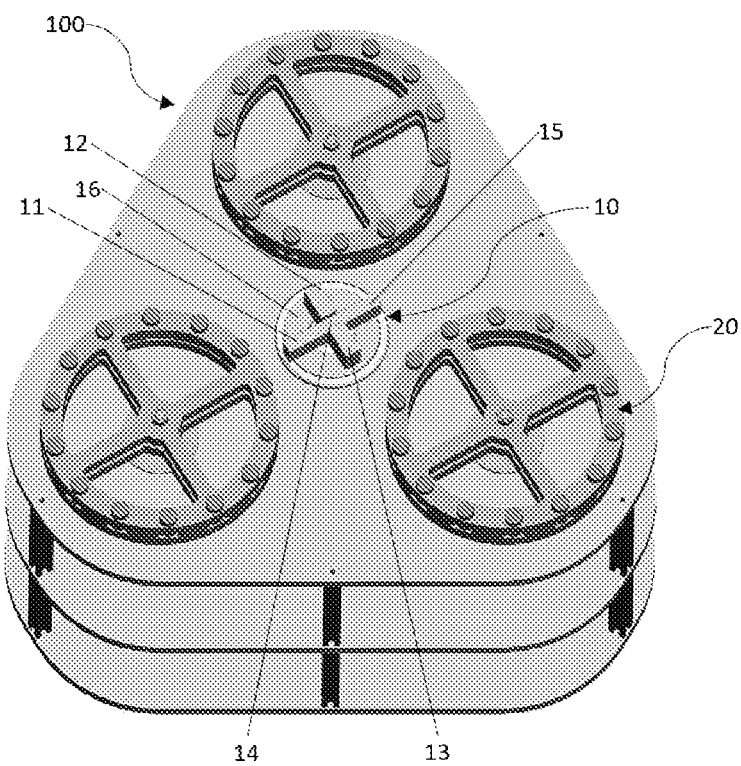
FIG. 2 illustrates a second three-dimensional view of one embodiment of the magnetic interaction system between rotors for the production and storage of rotational kinetic energy, comprising a primary rotor and three secondary rotors, wherein the reference numbers refer to:
    100—magnetic interaction system between rotors for the production and storage of kinetic energy;
    10—primary rotor;
    11—primary magnet A of the primary rotor.
Figure 3:
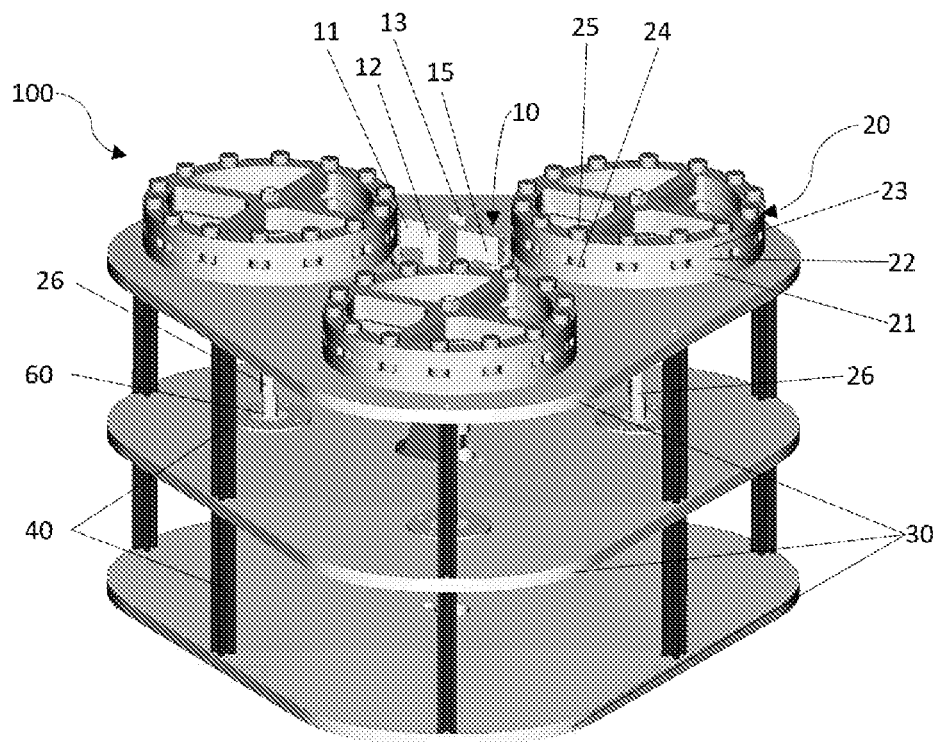

FIG. 3 illustrates a third three-dimensional view of one embodiment of the magnetic interaction system between rotors for the production and storage of rotational kinetic energy, comprising a primary rotor and three secondary rotors, wherein the reference numbers refer to:
100—magnetic interaction system between rotors for the production and storage of kinetic energy;
10—primary rotor;
11—primary magnet A of the primary rotor;
12—secondary magnet A of the primary rotor;
13—secondary magnet B of the primary rotor;
15—primary magnet B of the primary rotor;
20—secondary rotor;
21—lower support platform of the secondary rotor;
22—intermediate platform of the secondary rotor;
23—upper support platform of the secondary rotor;
24—lower magnet of the secondary rotor;
25—upper magnet of the secondary rotor;
26—rotation axis of the secondary rotor;
30—horizontal support platform of the rotor structure;
40—support pillar of the horizontal platforms;
60—rotation axis bearing of the secondary rotor.

Figure 4:
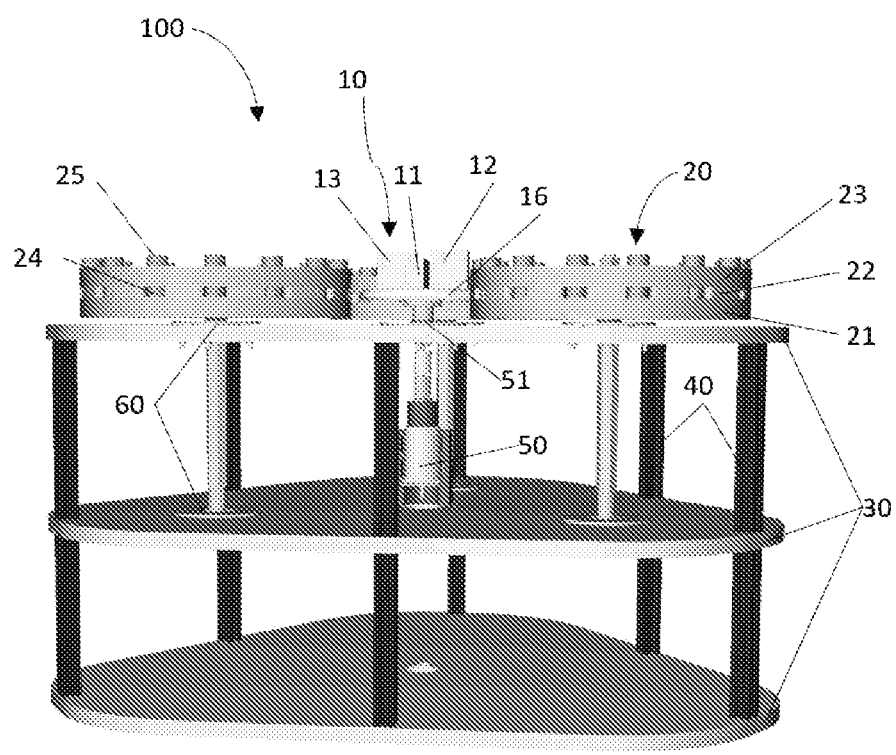

FIG. 4 illustrates a fourth three-dimensional view of one embodiment of the magnetic interaction system between rotors for the production and storage of rotational kinetic energy, comprising a primary rotor and three secondary rotors, wherein the reference numbers refer to:
100—magnetic interaction system between rotors for the production and storage of kinetic energy;
10—primary rotor;
11—primary magnet A of the primary rotor;
12—secondary magnet A of the primary rotor;
13—secondary magnet B of the primary rotor;
16—support platform of the primary rotor;
20—secondary rotor;
21—lower support platform of the secondary rotor;
22—intermediate platform of the secondary rotor;
23—upper support platform of the secondary rotor;
24—lower magnet of the secondary rotor;
25—upper magnet of the secondary rotor;
30—horizontal support platform of the rotor structure;
40—support pillar of the horizontal platforms;
50—mechanical propeller of the primary rotor;
51—rotation axis bearing of the primary rotor;
60—rotation axis bearing of the secondary rotor.

Figure 5:
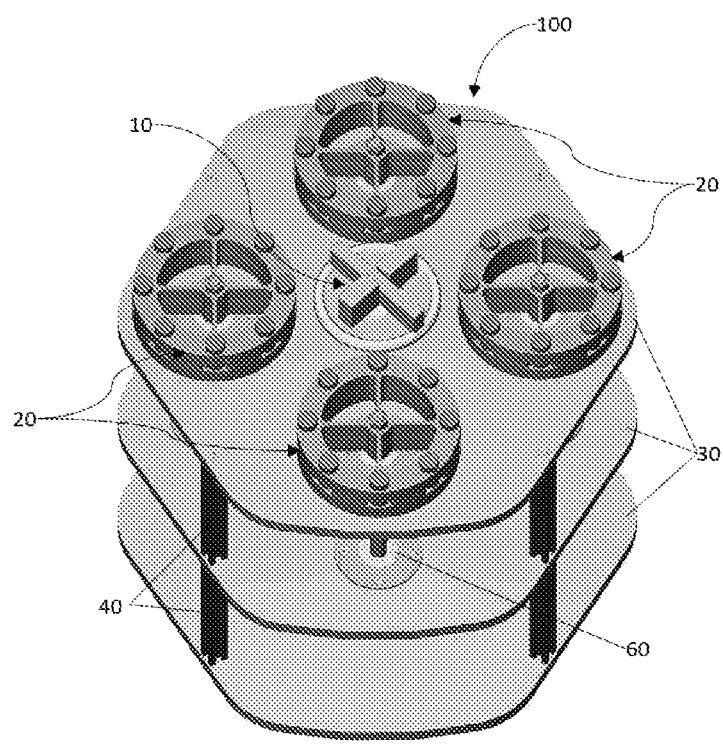

FIG. 5 illustrates a three-dimensional view of a further embodiment of the magnetic interaction system between rotors for the production and storage of rotational kinetic energy, comprising a primary rotor and four secondary rotors, wherein the reference numbers refer to:
100—magnetic interaction system between rotors for the production and storage of kinetic energy;
10—primary rotor;
20—secondary rotor;
30—horizontal support platform of the rotor structure;
40—support pillars of the horizontal platforms;
60—rotation axis bearing of the secondary rotor.

Figure 6:
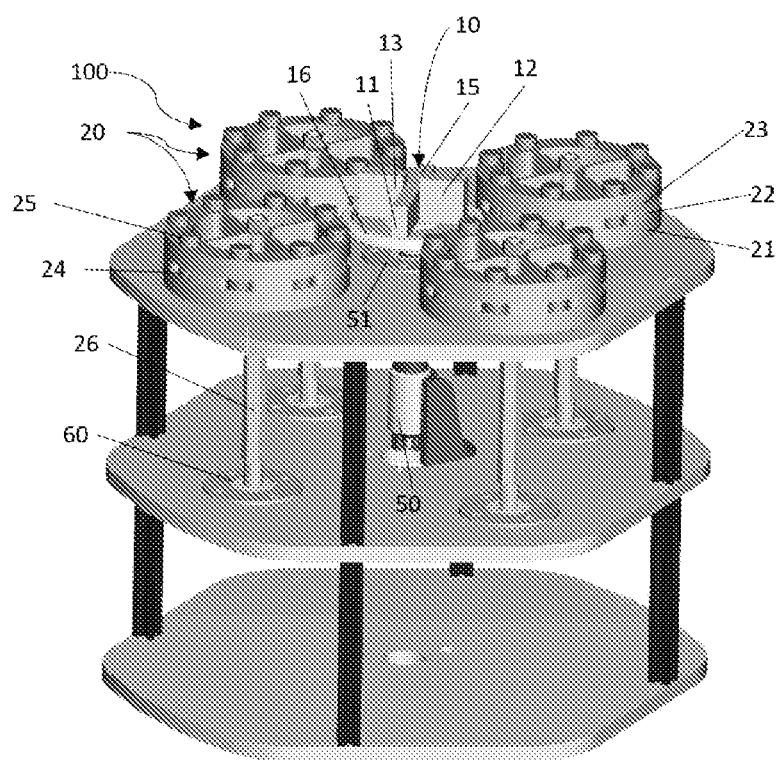

FIG. 6 illustrates a second three-dimensional view of a further embodiment of the magnetic interaction system between rotors for the production and storage of rotational kinetic energy, comprising a primary rotor and four secondary rotors, wherein the reference numbers refer to:
100—magnetic interaction system between rotors for the production and storage of kinetic energy;
10—primary rotor;
11—primary magnet A of the primary rotor;
12—secondary magnet A of the primary rotor;
13—secondary magnet B of the primary rotor;
15—primary magnet B of the primary rotor;
16—support platform of the primary rotor;
20—secondary rotor;
21—lower support platform of the secondary rotor;
22—intermediate platform of the secondary rotor;
23—upper support platform of the secondary rotor;
24—lower magnet of the secondary rotor;
25—upper magnet of the secondary rotor;
26—rotation axis of the secondary rotor;
50—mechanical propeller of the primary rotor;
51—rotation axis bearing of the primary rotor;
60—rotation axis bearing of the secondary rotor.

Figure 7:
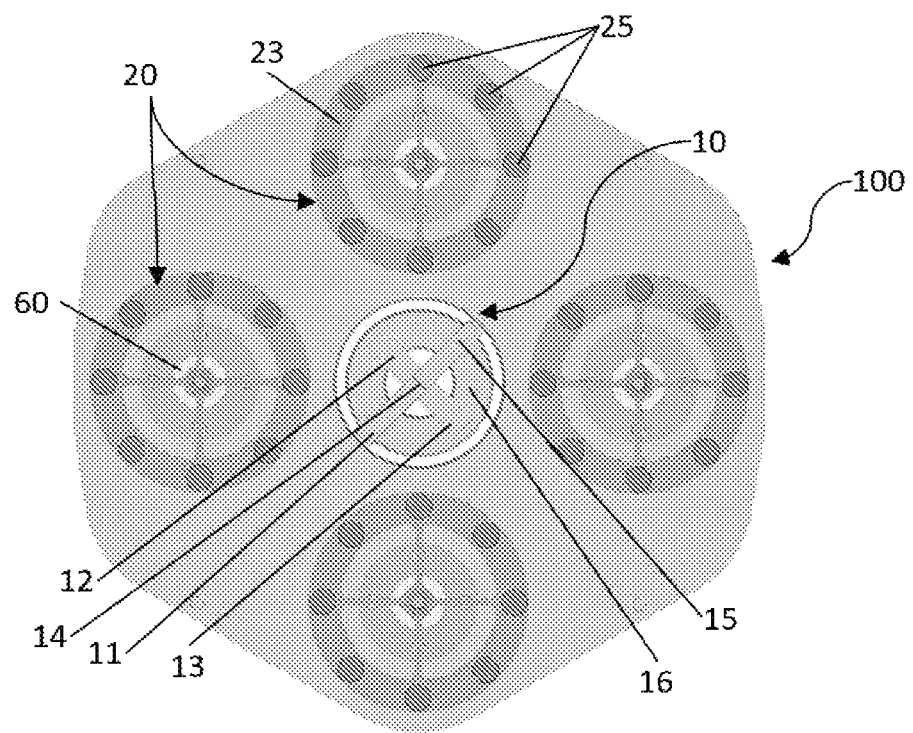

FIG. 7 illustrates a third three-dimensional view of a further embodiment of the magnetic interaction system between rotors for the production and storage of rotational kinetic energy, comprising a primary rotor and four secondary rotors, wherein the reference numbers refer to:
100—magnetic interaction system between rotors for the production and storage of kinetic energy;
10—primary rotor;
11—primary magnet A of the primary rotor;
12—secondary magnet A of the primary rotor;
13—secondary magnet B of the primary rotor;
14—rotation axis of the primary rotor;
15—primary magnet B of the primary rotor;
16—support platform of the primary rotor;
20—secondary rotor;
23—upper support platform of the secondary rotor;
25—upper magnet of the secondary rotor;
60—rotation axis bearing of the secondary rotor.

Figure 8:
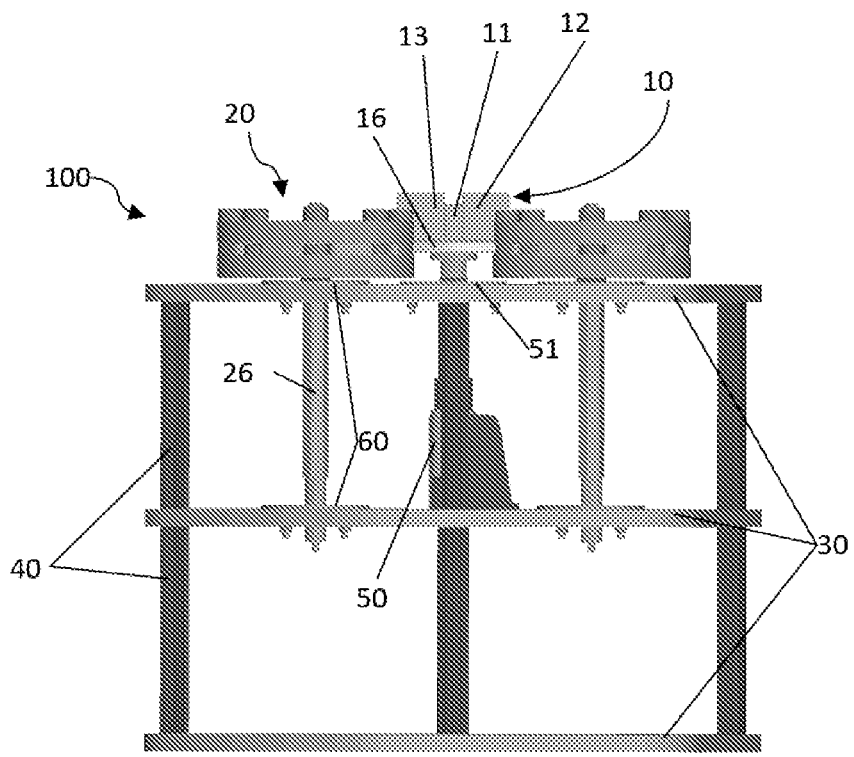

FIG. 8 illustrates a fourth three-dimensional view of a further embodiment of the magnetic interaction system between rotors for the production and storage of rotational kinetic energy, comprising a primary rotor and four secondary rotors, wherein the reference numbers refer to:
100—magnetic interaction system between rotors for the production and storage of kinetic energy;
10—primary rotor;
11—primary magnet A of the primary rotor;
12—secondary magnet A of the primary rotor;
13—secondary magnet B of the primary rotor;
20—secondary rotor;
26—rotation axis of the secondary rotor;
30—horizontal support platform of the rotor structure;
40—support pillar of the horizontal platforms;
50—mechanical propeller of the primary rotor;
51—rotation axis bearing of the primary rotor;
60—rotation axis bearing of the secondary rotor.

Figure 9:
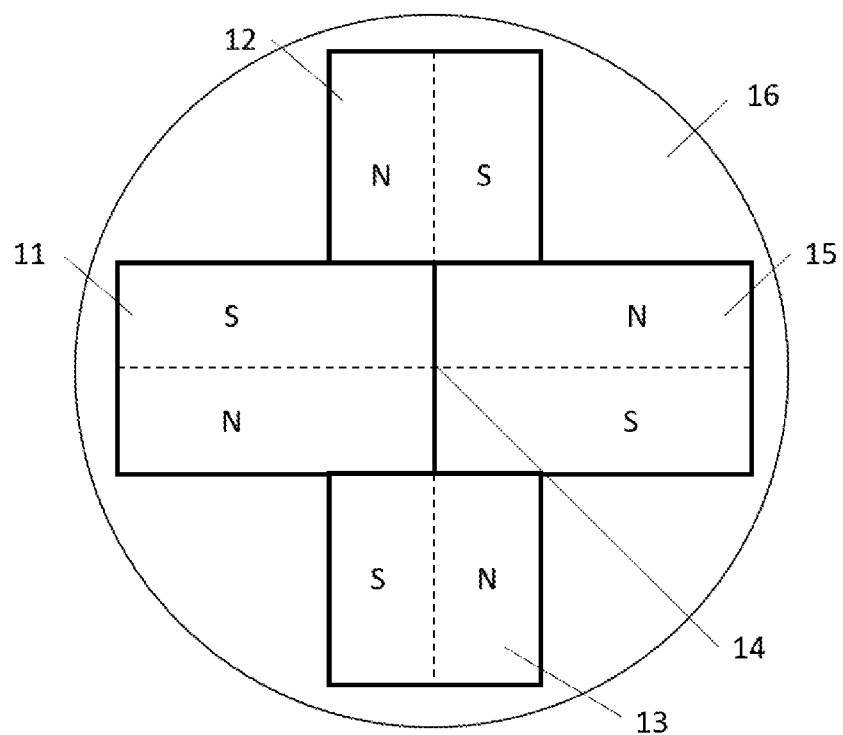

FIG. 9 illustrates a top view of a possible embodiment of the magnets resting on the primary rotor platform, wherein the reference numbers refer to:
11—primary magnet A of the primary rotor;
12—secondary magnet A of the primary rotor;
13—secondary magnet B of the primary rotor;
14—rotation axis of the primary rotor;
15—primary magnet B of the primary rotor;
16—support platform of the primary rotor.

Figure 10:
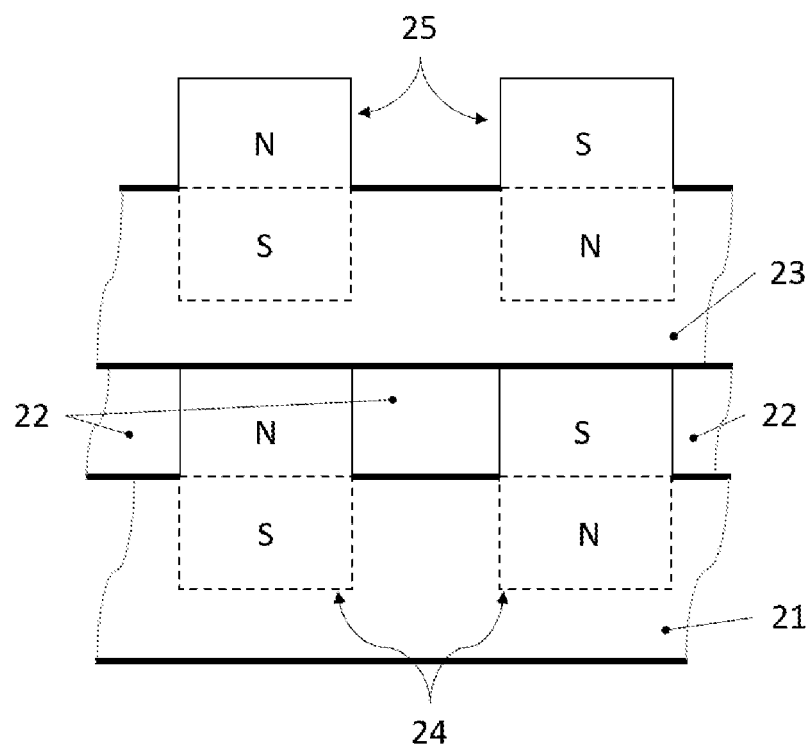

FIG. 10 illustrates a side sectional view of a possible embodiment of the positioning of the magnets in relation to the upper, lower and intermediate platforms of the secondary rotors, wherein the reference numbers refer to:

21—lower support platform of the secondary rotor;
22—intermediate platform of the secondary rotor;
23—upper support platform of the secondary rotor;
24—lower magnet of the secondary rotor;
25—upper magnet of the secondary rotor.

Figure 11:
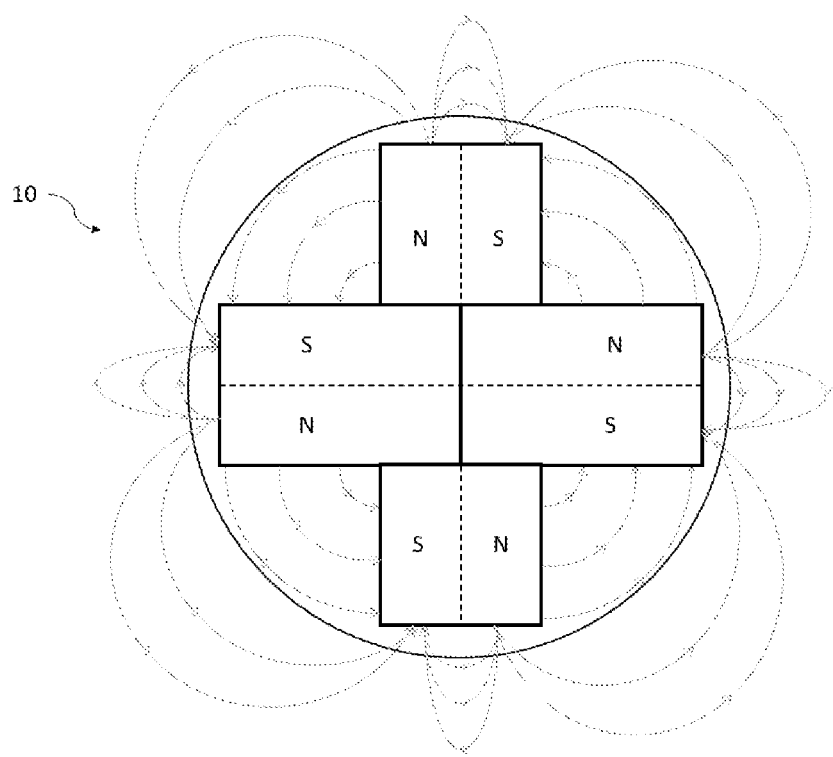

FIG. 11 illustrates a top view of the magnets of the primary rotor (10) and wherein the magnetic fields from the arrangement of the magnets are shown: primary A of the primary rotor (11), secondary A of the primary rotor (12), secondary B of the primary rotor (13) and primary B of the primary rotor (15).

Figure 12:
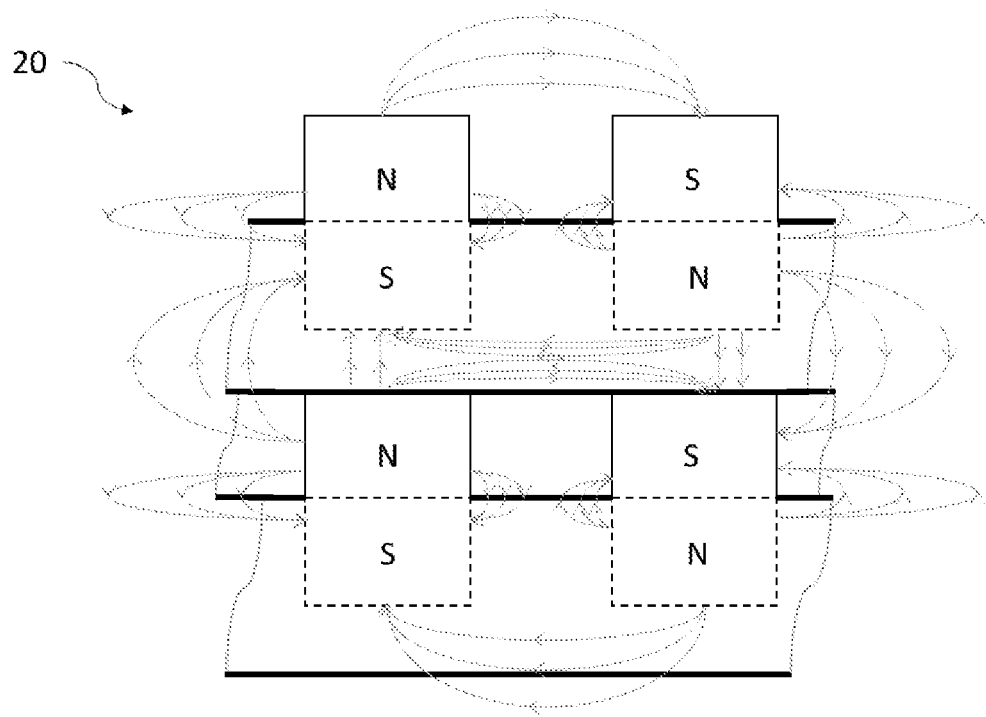

FIG. 12 illustrates a side sectional view of the secondary rotor (20) and wherein the magnetic fields from the arrangement of the magnets are represented: lower of the secondary rotor (24) and upper of the secondary rotor (25).

Figure 13:
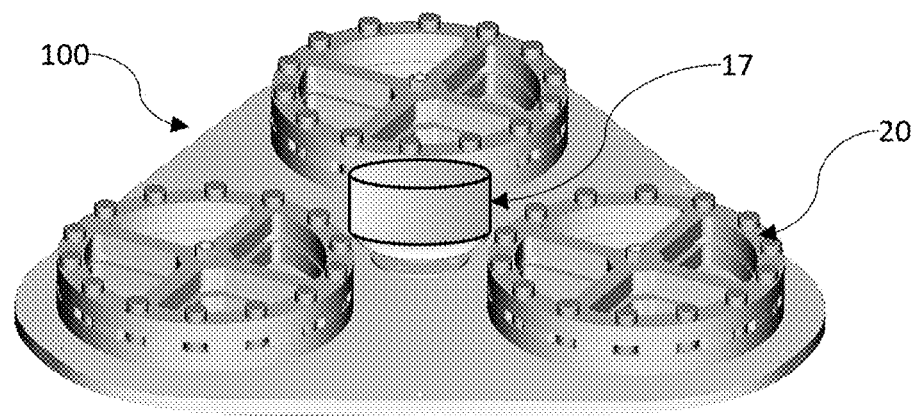

FIG. 13 shows the closed circular cover (17).

Figure 14:
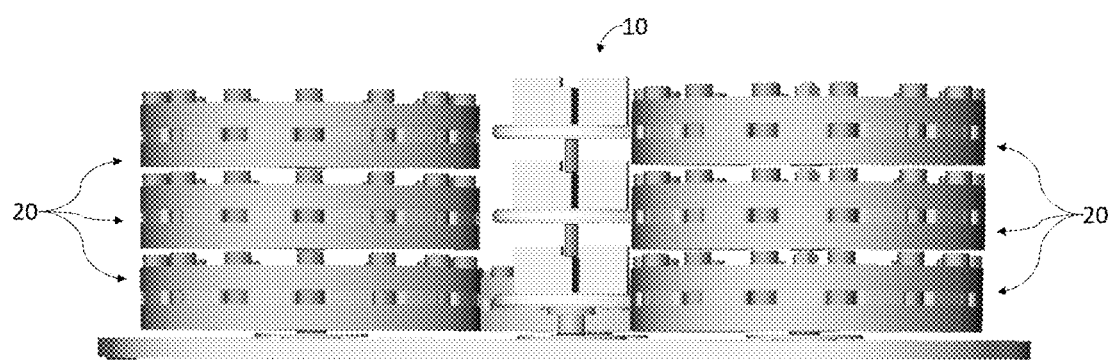

FIG. 14 shows the overlapping and suspended set of primary rotors (10) and overlapping and suspended set of secondary rotors (20).

DESCRIPTION OF THE EMBODIMENTS

Referring to the figures, some embodiments are now described in more detail, which are not intended, however, to limit the scope of the present application.

The present application describes a magnetic interaction system between rotors for the production and storage of rotational kinetic energy.

One of the preferred embodiments proposed for the system (100) comprises the use of a support platform (30) on which the support structure of the primary rotor (10) and the support structure of the secondary rotors (20), which will rotate on an axis (14, 26), shall be arranged. The platform (30) comprises a bearing (51) mechanically adapted to ensure the support of the rotation axis (14) of the primary rotor (10) of the system (100). This rotation axis (14) of the primary rotor (10) is connected to a mechanical propeller (50), which may be one of an electric motor, a generator-motor, a motor-propeller or other mechanism, provided to be mechanically adapted and enabled to guarantee the supply of rotational motion to said axis (14) of the primary rotor (10).

The primary rotor (10) is composed of a platform (16), in one of the preferred embodiments comprising a disc shape, adapted to rotate on the axis (14) thereof, with characteristics not influencing with the magnetic fields of the magnets that are based thereon. On the upper face of the disc (16) a first set of magnets (11, 12, 13, 15) will be installed. The positioning of the set of magnets (11, 12, 13, 15) of parallelepiped shape, according to one of the preferred embodiments, is made in the shape of a cross. As mentioned above, both the primary magnets A and B (11, 15) and secondary magnets A and B (12, 13) of the primary rotor (10) have a parallelepiped shape, as well as a longitudinal magnetic arrangement with respect to its longer axis, as suggested in FIG. 9. Thus, and in order to obtain the aforementioned cross shape, both primary magnets A and B (11, 15) of the primary rotor (10) are arranged on its narrower side face in order to guarantee the magnetic separation between the North and South poles perpendicularly to the rotation plane of the disc (16) of the primary rotor (10), also guaranteeing the combination between North-South and South-North poles between the primary magnets A and B (11, 15). The central joining point of the primary magnets A and B (11, 15) is centrally positioned to coincide with the rotation axis (14) of the primary rotor (10).

The installation of the remaining magnets on the disc (16) of the primary rotor (10) in order to obtain the cross shape is achieved by connecting the longitudinal axis of the secondary magnets A and B (12, 13) to the longitudinal center of the union of the two primary magnets A and B (11, 15). Thus, the longitudinal face of the North pole of the secondary magnet A (12) will be magnetically joined to the longitudinal face of the South pole of the primary magnet A (11) and the longitudinal face of the South pole of the secondary magnet A (12) will be magnetically joined to the longitudinal face of the North pole of the primary magnet B (15).

The same is true, but in an analogous way with the secondary magnet B (13) of the primary rotor (10), thus the longitudinal face of the North pole of the secondary magnet B (13) being magnetically joined to the longitudinal face of the South pole of the primary magnet B (15) and the longitudinal face of the South pole of the secondary magnet B (13) being magnetically joined with the longitudinal face of the North pole of the primary magnet A (11).

According to one of the proposed embodiments, illustrated in FIGS. 1 to 4, and still with regard to the platform (30), and around the primary rotor (10), three secondary rotors (20) will be mounted equidistantly from the rotation axis (14) of the primary rotor (10), whose rotation axis (26), in addition to being at an equidistant distance from the rotation axis (14) of the primary rotor (10), have an equilateral triangle arrangement.

Now, each of the three secondary rotors (20) is coupled to the platform (30) by means of a bearing (60), which is mechanically adapted to the rotation axis (26) of the secondary rotor (20), in order to ensure the correct attachment thereof to said platform (30). In order to ensure greater stability to the rotation axis (26) of the secondary rotor (20), and due to the rotation speeds involved, it may be coupled by means of additional bearings (60) to more than one platform (30) adjacently arranged and supported by additional pillars (40). Both the rotation axis bearings of the primary rotor (51) and the rotation axis bearings of the secondary rotor (60), in one of the preferred embodiments, may additionally use support boxes in order to minimize vibrations from the high rotation speeds achieved, thus minimizing the creation of gaps between the bearing and the support base of the axes, i.e., the platforms (30).

Each of the three secondary rotors (20) is composed of three platforms (21, 22, 23), or discs, preferably ring shaped, with a lower support disc (21) being circular, an intermediate disc (22) being circular and an upper support disc (23) being circular, said discs (21, 22, 23) being mechanically adapted to the top of the central rotation axis (26) of the secondary rotor (20) which is mechanically adapted to said bearings (60). Each of these discs (21, 22, 23) making up the secondary rotor (20) has a ring shape and is installed centrally around said rotation axis (26). The discs must be constructed of non-magnetic material, or a material that does not interfere with the magnetic fields created between the rotors (10, 20) of the system (100), such as brass and wood. Both the lower support (21) and the upper support (23) platforms will comprise the installation of a set of magnets (24, 25) equidistant and radially arranged around its entire circular edge in a ring shape, in a consecutive sequence of N (north)/S (south) polarities. The magnets (24, 25) installed on the surface of said support platforms (21, 23), in one of the preferred embodiments, have a cylindrical shape, and comprise a magnetic arrangement with axial shape in relation to the axis thereof, one of the faces being the north pole (N), and the opposite face the south pole (S). FIG. 10 shows one of the preferred embodiments of the present invention, and which supports the above-listed description, wherein the polarity arrangement of the upper magnet (25) and the lower magnet (24) is made consecutively of north/south (N/S) polarities, whereby the south (S) polarity of the lower magnet (24) will be seated on the upper face of the lower support disc of the secondary rotor (21), and will have the north polarity (N) in contact with the lower face of the upper support disc (23). In turn, the upper magnet (25) will have the south polarity (S) in contact with the upper face of the upper support disc (23). Although there is magnetic attraction between the lower magnet (24) and the upper magnet (25), the upper support base (23) ensures physical separation between said magnets (24, 25), avoiding the consequent direct contact between the lower magnet (24) and upper magnet (25) due to the assembly and arrangement of polarities. The practically ring shape of the support discs (21, 22, 23) promotes a greater concentration of the mass of the secondary rotor body (20) on its outer edge, thus substantially increasing the inertia of the set of secondary rotors (20). The intermediate disc (22) will occupy the clearances between each of the lower magnets (24) installed equidistantly on the edge of the lower support disc (21), its function being to increase the mass of the secondary rotor (20). For the particular case of implementing the system using three secondary rotors (20), each lower support disc (21) and upper support disc (23) comprises the application of fourteen magnets on its surface, or more specifically, the lower support disc (21) comprises installation on its ring edge of fourteen lower magnets (24), and the upper support disc (23) comprises installation on its ring edge of fourteen upper magnets (25). Thus, each secondary rotor (20), in one of the proposed embodiments of the present invention, comprises the use of twenty-eight neodymium magnets. The use of this type of magnets, and the way they are radially arranged along the ring forming the secondary rotors (20), allows the rotational motion of the primary rotor (10), mechanically conferred by the mechanical propeller (50), to affect the behavior of the secondary rotors (20), forcing them to move in a constant and uninterrupted synchronized way due to the interaction and linkage of the magnetic forces present in the rotors (10, 20), but in opposite rotation directions.

The positioning and superposition of the magnets (24, 25) on the secondary rotors (20), combined with the particular arrangement of the four magnets (11, 12, 13, 15) on the primary rotor (10) in a cross shape, allows for a correct uniform and effective interaction of the magnetic fields, leading to perfect synchronism between the primary rotor (10) and the secondary rotors (20).

In order to minimize the effects caused by air friction incident on the primary magnets in parallelepiped shape (11, 12, 13, 15), with the primary magnets (11, 15) being mounted on the narrower face thereof on the disc (16) of the primary rotor (10) when they are in rotational motion about the axis thereof (14) by the action of the mechanical propeller (50), a closed circular cover is used and dimensionally adapted to the dimensions of the primary rotor (10) in order to incorporate the primary magnets (11, 12, 13, 15) in its interior, not interfering with the magnetic fields generated in the system (100). In one of the preferred embodiments of the present invention, the primary rotor disc (16) is positionally aligned in terms of height, with reference to the platform (30), with the secondary rotor intermediate disc (22), which alignment allows obtaining better rotational performance induced by the primary rotor (10) on the secondary rotors (20). It should be noted that ferrite magnets do not work correctly in the system (100), which is why, in one of the preferred embodiments of the system (100), neodymium magnets are used, due to the high magnetic field, together with the small dimensions and long service life thereof. In the near future, alternatively 100% synthetic neodymium magnets, electromagnets, magnetic superconductors or nano magnetism may be used, which contain the same magnetic characteristics in a similar or superior way to the neodymium magnets herein suggested.

Both in the embodiment proposed in FIGS. 1 to 4, and in the embodiment proposed in FIGS. 5 to 8, the positioning and spacing of the secondary rotors (20) with regard to their rotation axes (26) ensures that the magnetic forces coming from the magnets (24, 25) installed on the edges of the discs thereof (21, 22, 23), do not influence their pairs. That is, with the arrangement of the secondary rotors (20) proposed in both embodiments, the rotational motion of an independent secondary rotor (20) does not influence the rotational motion of an adjacent secondary rotor (20). Thus, the optimization of energy losses in the system is ensured, since the actuation of the secondary rotors (20) only work under the influence of the rotational motion of the primary rotor (10).

In one non-limiting embodiment proposed for the present invention, and as a demonstration of the operation of the system (100) proposed in FIGS. 1 to 4, the diameter of the secondary rotors (20) is approximately 125% greater than the diameter of the primary rotor (10). The same is true for the mass of the secondary rotors (20) which is approximately 250% greater than the mass of the primary rotor (10). With these dimensional ratios, when the system (100) reaches the intended rotational speed in the primary rotor (10), it maintains a rotational speed approximately 75% greater than the rotational speed in the secondary rotors (20). However, due to the dimensions (diameter) of the secondary rotors (20), the circular motion with tangential speed of the secondary rotors (20) is approximately 30% greater than the circular motion with tangential speed of the primary rotor (10), due to the greater diameter thereof. Now, taking these parameters into account, it is possible to mathematically determine that the system (100) composed of the primary rotor (10) and the three secondary rotors (20) when in operation, manifests a production of rotational kinetic energy in each of the secondary rotors (20) greater than the kinetic energy produced by the primary rotor (10) by about 700%, through the mechanical propeller (50) which is coupled to the rotation axis (14) thereof, and which in the set of three secondary rotors (20) translates into a higher ratio and above 2200% than the rotational kinetic energy produced by the primary rotor (10). These percentage values are achieved due to the capacity of the system herein presented to innovate the state of the art and to be able to convert the potential energy present in the secondary rotors into rotational kinetic energy. This conversion occurs due to several factors, including the high efficiency of the bearings used, allowing for very low friction of the primary (10) and secondary (20) rotors on each of its axes (14, 26), guaranteed by the construction properties and characteristics of the rotation axis bearing of the primary rotor (51) and the rotation axis bearings of the secondary rotor (60).

Another preponderant factor of the primary rotor (10) is that it comprises a lower inertia in relation to the secondary rotors (20), in addition to the physical aspects, such as smaller diameter and smaller mass, it has to do with the positioning and distribution of most of its mass. Most of its mass is centrally located on its axis (14). In this way, the energy requirements to promote the rotational motion of the set formed by said primary rotor (10) are reduced. Furthermore, the base (16) of the primary rotor (10) has a disc shape, which reduces the inertia thereof. On the other hand, the secondary rotors (20) have greater inertia, not only due to their physical aspects, such as larger diameter and greater mass, but also because the distribution of most of its mass is positioned on the ring-shaped edge thereof, thus increasing inertia, which is also enhanced by the arrangement of the lower and upper magnets (24, 25) around said ring edge. However, the impact of the amount of energy required to set the secondary rotors (20) in rotational motion is minimized by the aforementioned interaction and mutual interlocking of magnetic forces between the magnets (11, 12, 13, 15) of the primary rotor (10) with the magnets (24, 25) of the secondary rotors (20). Through this magnetic interlocking, the energy needed to create rotational motion in the secondary rotors is applied point-to-point on each magnet making up the secondary rotors. This allows, through the correct magnetic interaction between the primary and secondary rotors, a very low energy consumption and a high degree of efficiency.

Even if the diameter and mass of the secondary rotors (20) were equal to that of the primary inductor rotor (10), the rotational kinetic energy produced by the set of secondary rotors (20) would be greater than the rotational kinetic energy of the primary rotor (10).

The system (100) described above, makes it possible to convert the potential energy existing in the system (100) into rotational kinetic energy. This production of rotational kinetic energy can be stored or used directly. The system (100) allows the production and storage of kinetic energy in the secondary rotors (20) to be greater than the rotational kinetic energy necessary for putting the system (100) into operation through the primary rotor (10).

The primary rotor (10) may eventually incorporate an elevator to allow fine adjustment of the height defined by the set of magnets (11, 12, 13, 15) in relation to the set of magnets (24, 25) present in each of the secondary rotors (20). This adjustment may eventually promote an improvement in the system's performance (100) with regard to the increase in the production capacity, capture and storage of the system's kinetic energy, leading to a higher degree of efficiency.

Still in an alternative embodiment of the present invention, the system (100) of magnetic interaction between rotors (10, 20) for the production and storage of kinetic energy comprises the use of an additional secondary rotor (20), thus totaling four secondary rotors (20). This time, the positioning of the secondary rotors (20) around the primary rotor (10) is made according to a diamond-shaped arrangement wherein the center of rotation of the secondary rotors (20) is uniformly distributed at the same distance from the primary rotor (10).

For this particular case, and in a non-limiting way, in dimensional terms, the proposed composition presented in FIGS. 5, 6, 7 and 8, is slightly different, as it contemplates the use of only eight sets of magnets (24, 25) in each disc (21, 23) of the secondary rotor (20), making a total of sixteen magnets (24, 25) overlapped by each secondary rotor (20). In this composition, the secondary rotors (20) have a diameter approximately 40% greater than the diameter of the primary rotor (10), and their mass is approximately 112% greater than the mass of the primary rotor (10). With these dimensional ratios, the rotational speed induced in the secondary rotors (20), through the magnetic interaction in the system (100), is the same rotational speed as the primary rotor (10), that is, it presents a 1:1 ratio to rotational speed level. However, due to the dimensions (diameter) of the secondary rotors (20), the circular motion with tangential speed of the secondary rotors (20) is approximately 40% greater than the circular motion with tangential speed of the primary rotor (10).

Now, taking these parameters into account, it is possible to mathematically determine that the system (100) composed of the primary rotor (10) and the four secondary rotors (20) suggested in this embodiment, when in operation, manifests a production of rotational kinetic energy in each of the secondary rotor (20) approximately 470% greater than the rotational kinetic energy produced by the primary rotor (10), and which in the set of four secondary rotors (20) translates into a ratio greater than 2100% than the rotational kinetic energy produced by the primary rotor (10).

This means that, in both approaches proposed for the present system (100), with the use of three or four secondary rotors (20), the capacity to convert the system's potential energy (100) into rotational kinetic energy is always substantially greater than the rotational kinetic energy supplied to the system (100) through the primary rotor (10). It is possible to verify and prove that in both proposed embodiments of the system (100), there is no physical and/or mechanical connection between the primary rotor (10) and the secondary rotors (20), nor between the secondary rotors themselves (20) for rotational kinetic energy transfer.

The production of kinetic energy in the secondary rotors (20) is done solely and exclusively through the existing magnetic ratio and the materials used in the system (100) developed. This magnetic ratio of the system (100) allows the secondary rotors (20) to constantly and uninterruptedly maintain a tangential speed greater than the tangential speed of the primary rotor (10), even though the secondary rotors (20) have a greater diameter and mass than the diameter and mass of the primary rotor (10).

In order to further optimize these results, it is possible to incorporate this system (100) using cylinders in the rotors (10, 20) in a suspended and vacuum-closed structure, and the bearings (51, 60) used may also be magnetic in order to minimize friction losses.

The present description is of course in no way restricted to the embodiments presented herein and a person of ordinary skill in the art may provide many possibilities of modifying it without departing from the general idea as defined in the claims. The preferred embodiments described above are obviously combinable with each other. The following claims further define preferred embodiments.

The invention claimed is:

1. A magnetic interaction system between rotors for the storage of kinetic energy (100), comprising
   a primary rotor (10) mechanically adapted to at least one platform (30) by means of a rotation axis (14), said primary rotor (10) comprising a first set of magnets; and
   at least three secondary rotors (20), mechanically adapted to the at least one platform (30) by means of rotation axes (26) independent and equidistant from the rotation axis (14) of the primary rotor (10);
   the primary rotor being activated by a mechanical system to induce motion in the at least three secondary rotors through magnetic interaction;
   wherein each of the at least three secondary rotors (20) comprises: a ring shape comprised of at least two overlapping ring-shaped platforms over the same rotation axis (26), the at least two overlapping ring-shaped platforms including a lower ring-shaped support platform (21) and an upper ring-shaped support platform (23) on which a second set of magnets are adapted to and which comprise a lower set of magnets (24)

installed over an edge of the lower ring-shaped platform (21) and an upper set of magnets (25) installed over an edge of the upper ring-shaped support platform (23), the upper set of magnets (25) being separate from the lower set of magnets (24) by the upper ring-shaped support platform (23); and an intermediate ring-shaped platform (22) occupying clearances between the at least two overlapping ring-shaped platforms and the second set of magnets, wherein surfaces of the intermediate ring-shaped platform (22) and the lower set of magnets (24) facing the upper ring-shaped support platform (23) are in contact with the upper ring-shaped support platform (23).

2. The magnetic interaction system between rotors for the storage of kinetic energy (100), according to claim 1, wherein the primary rotor (10) comprises a closed circular cover dimensionally adapted to incorporate the first set of magnets inside said cover, which presents noninterfering constructive properties with the magnetic fields of the first set of magnets and the second set of magnets and promotes the improvement of the aerodynamic performance of the primary rotor (10).

3. The magnetic interaction system between rotors for the storage of kinetic energy (100), according to claim 1, wherein the first set of magnets is adapted to the primary rotor (10) by means of a platform (16) centrally positioned over the rotation axis (14).

4. The magnetic interaction system between rotors for the storage of kinetic energy (100), according to claim 3, wherein the first set of magnets comprises two primary magnets A and B (11, 15) magnetically joined and arranged on the narrower side face thereof on the surface of the platform (16) centrally positioned over the rotation axis (14), a secondary magnet A (12) and a secondary magnet B (13) mounted laterally in the shape of a cross and oppositely and coincident with the joining point of the two primary magnets A and B (11, 15) and the rotation axis (14).

5. The magnetic interaction system between rotors for the storage of kinetic energy (100), according to claim 3, wherein the platform (16) centrally positioned over the rotation axis (14) is positionally aligned with the elevation of the intermediate ring-shaped platform (22) with reference to the at least one platform (30).

6. The magnetic interaction system between rotors for the storage of kinetic energy (100), according to claim 1, wherein the first set of magnets comprises a cross arrangement.

7. The magnetic interaction system between rotors for the storage of kinetic energy (100), according to claim 1, wherein the primary rotor (10) and the at least three secondary rotors (20) comprise a cylindrical shape and magnetic rotation axis bearings (51, 60) mechanically adapted to the at least one platform (30) so as to promote the suspension thereof in a closed vacuum environment.

8. The magnetic interaction system between rotors for the storage of kinetic energy (100), according to claim 1, wherein the primary rotor (10) and the at least three secondary rotors (20) comprise a cylindrical shape inside of which the first set of magnets and the second set of magnets are installed.

9. The magnetic interaction system between rotors for the storage of kinetic energy (100), according to claim 1, comprising at least one overlapping and suspended set of primary rotors (10) and at least one overlapping and suspended set of secondary rotors (20) mechanically adapted to at least one platform (30) in order to optimize space and energy production capacity.

10. The magnetic interaction system between rotors for the storage of kinetic energy (100), according to claim 1, wherein each of the at least three secondary rotors (20) comprises a diameter greater than the diameter of the primary rotor (10), and wherein each of the at least three secondary rotors (20) comprises an angular speed greater than the angular speed of the primary rotor (10).

\* \* \* \* \*